June 14, 1955 — N. G. CARLSON — 2,710,434
RAIL BONDING APPARATUS AND METHOD
Filed July 3, 1950 — 4 Sheets-Sheet 1
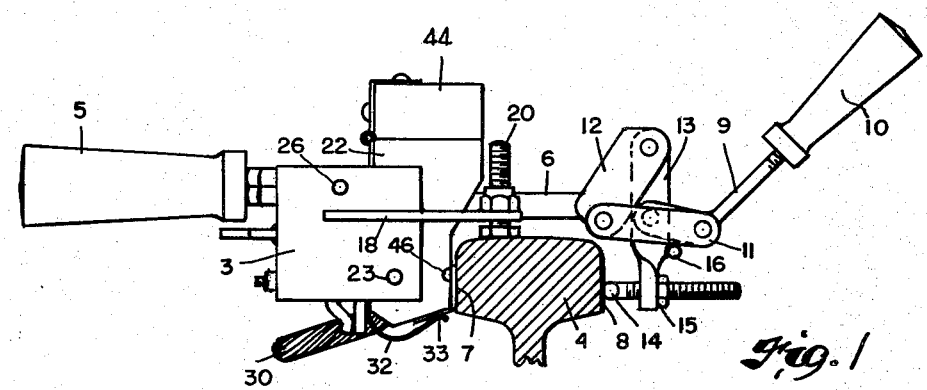
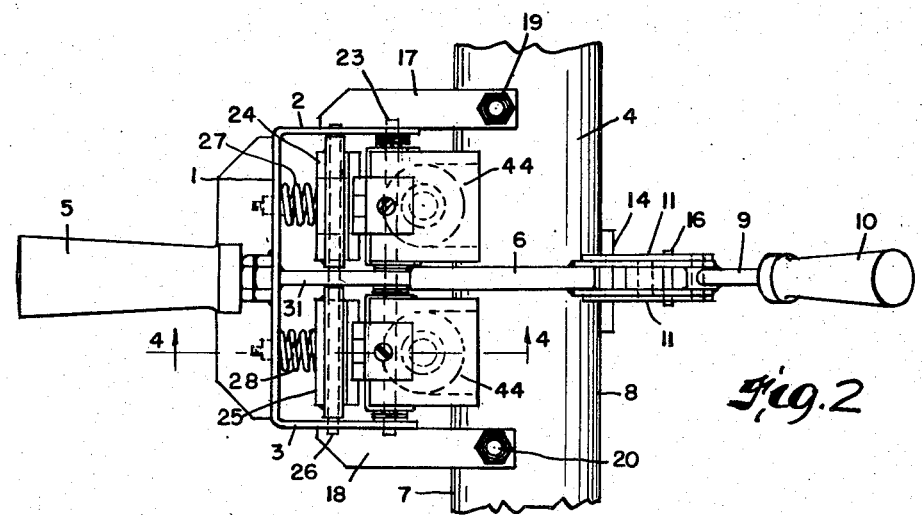
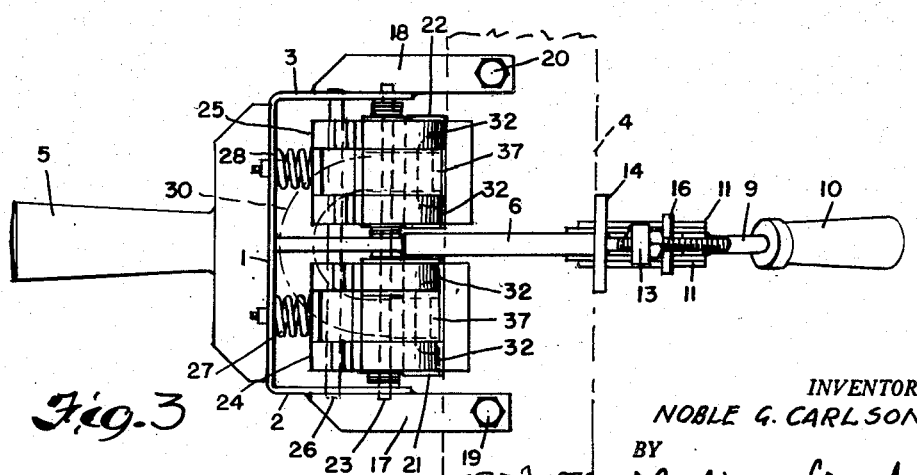
INVENTOR.
NOBLE G. CARLSON
BY
Oberlin & Limbach
ATTORNEYS.

June 14, 1955  N. G. CARLSON  2,710,434
RAIL BONDING APPARATUS AND METHOD
Filed July 3, 1950  4 Sheets-Sheet 2

INVENTOR.
NOBLE G. CARLSON
BY
Oberlin & Limbach
ATTORNEYS.

June 14, 1955 N. G. CARLSON 2,710,434
RAIL BONDING APPARATUS AND METHOD
Filed July 3, 1950 4 Sheets-Sheet 3

INVENTOR.
NOBLE G. CARLSON
BY
Oberlin + Limbach
ATTORNEYS.

June 14, 1955 N. G. CARLSON 2,710,434
RAIL BONDING APPARATUS AND METHOD
Filed July 3, 1950 4 Sheets-Sheet 4

INVENTOR.
NOBLE G. CARLSON
BY
Oberlin & Limbach
ATTORNEYS

United States Patent Office 2,710,434
Patented June 14, 1955

2,710,434

RAIL BONDING APPARATUS AND METHOD

Noble G. Carlson, Cleveland Heights, Ohio, assignor to Erico Products, Inc., Cleveland, Ohio, a corporation of Ohio Application July 3, 1950, Serial No. 171,880

19 Claims. (Cl. 22—116)

This invention relates as indicated to a novel bonding apparatus and method particularly adapted to the attachment of rail bonds to a face of a rail head of limited vertical extent.

In Patent No. 2,229,045 of Charles A. Cadwell, there is disclosed a welding material adapted for use in an exothermic reaction and comprising a mixture of copper oxide and a crushed copper aluminum alloy which, when ignited, will produce a charge of molten copper suitable for immediate use in the welding of a copper or copper alloy rail bond to a steel rail or the like. Patent No. 2,277,014 to Noble G. Carlson discloses a form of rail bonding apparatus particularly suited for use with the aforesaid welding material in the attachment of rail bonds to rails, such apparatus comprising two spaced mold blocks and common clamping means therefor adapted to clamp the same against the side of a rail head. Such welding material and apparatus have enjoyed great commercial success for the past several years.

Some difficulty has, however, been encountered in attaching bonds to rail heads where such rail heads have been considerably worn down, the face of the rail head no longer being of sufficient vertical extent properly to seal off the mold cavity in the usual form of mold block opposed thereto and in which an end of such bond is adapted to be received in juxtaposition to the rail head. Such mold blocks are ordinarily formed of graphite which, otherwise a very suitable material, is somewhat fragile if shaped to expose relatively thin protruding edge portions and the like. The problem of attaching bonds to worn-down rail heads is, of course, accentuated when it is desired to affix the larger sizes of bonds thereto. It will also be appreciated that rail bonds should not be attached at a point too near the top of the rail head in order to reduce the likelihood of damage thereto. For this reason, it is frequently desirable to attach such bonds closely adjacent the lower edge of the rail head even when new and unworn rails are to be bonded.

It is accordingly a principal object of my invention to provide welding apparatus and a method of welding particularly adapted to the attachment of rail bonds and the like to metal surfaces and especially the sides of steel rail heads which have been considerably worn down in use and therefore afford a surface of limited vertical extent for thus attaching such bonds.

It is a further object of my invention to provide an apparatus and method whereby such bonds may be securely welded to the side of a rail head closely adjacent the lower edge of the latter.

Still another object is to provide a novel mold and bond assembly adapted to ensure both proper merging of the bond end into the metal of the cast terminal and also a strong weld to the side of the rail head when the molten weld metal is released into the mold cavity.

A further object is to provide a metal mold bottom member designed for employment in conjunction with such graphite mold member and the rail bond to define the mold cavity receiving such molten charge.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevational view of one embodiment of my improved apparatus illustrating the manner in which the same may be mounted upon a rail head;

Fig. 2 is a top plan view of the apparatus of Fig. 1;

Fig. 3 is a bottom plan view of the apparatus of Fig. 1;

Figure 4:
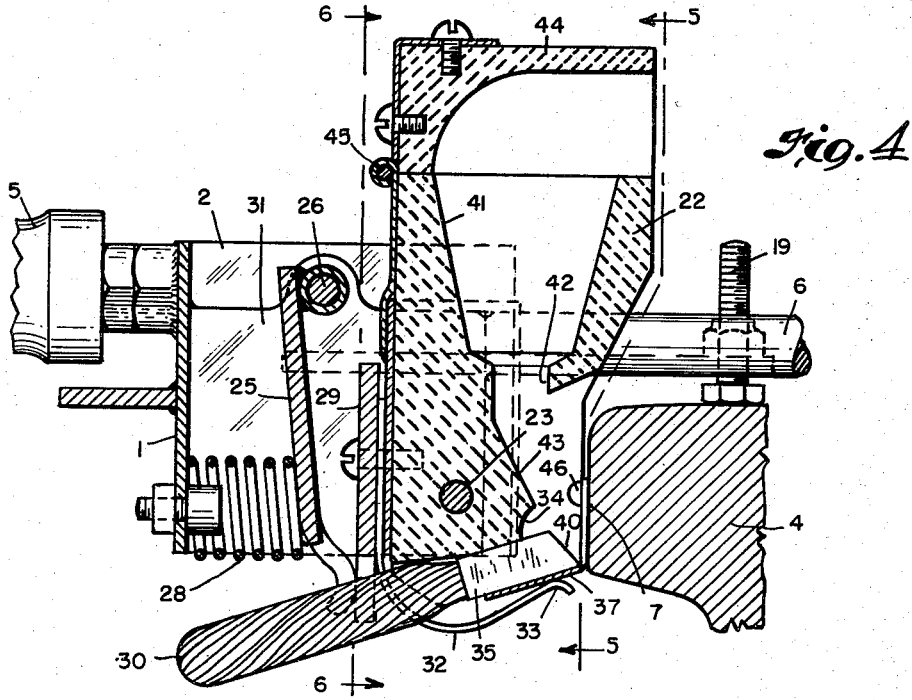
Fig. 4 is a vertical sectional view taken along the line 4—4 on Fig. 2.
Figures 5, 6, 7:
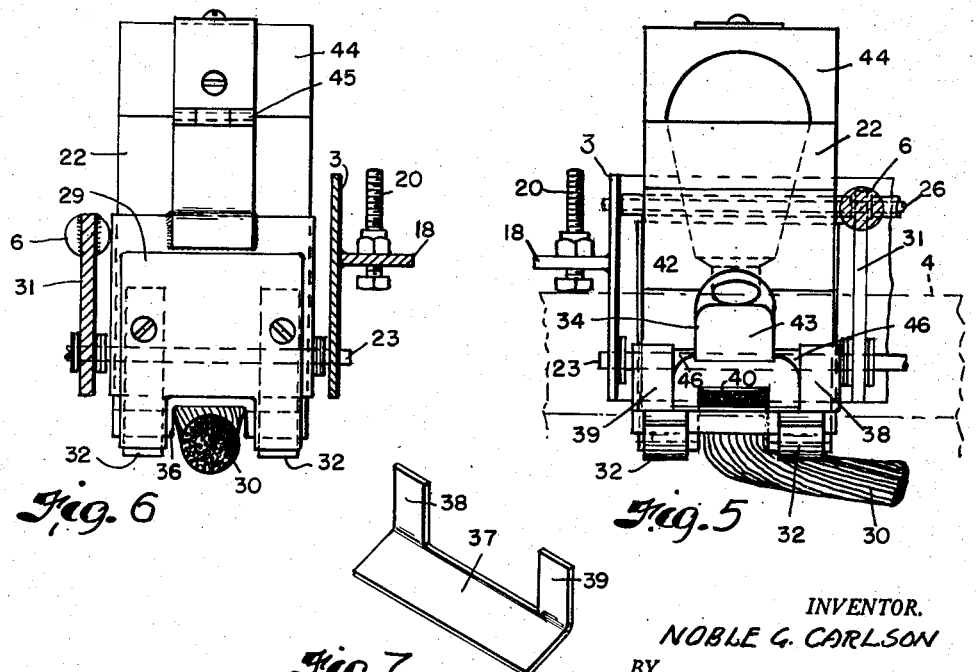
Fig. 5 is an elevational view of one mold assembly taken on the line 5—5 on Fig. 4.
Fig. 6 is an elevational view taken on the line 6—6 on Fig. 4.
Fig. 7 is a detail perspective view of a sheet metal mold bottom member adapted to be employed as one component of the mold assembly of the aforesaid figures.

Referring now more particularly to said drawing and especially Figs. 1–7 thereof, the embodiment of my invention there illustrated comprises a main frame 1 of general U-shape having side arms 2 and 3 adapted to extend toward the rail head 4. A handle 5 is secured to such frame extending therefrom in a direction opposite to tension bar 6 which is adapted to overlie such rail head and is provided with toggle clamping means for drawing such frame toward the face 7 of the rail head.

Figs. 1–3 inclusive show such toggle clamping mechanism in locked position against the opposite side 8 of the rail head, such mechanism including a curved clamping lever 9 provided with a handle 10 and pivotally connected by means of a pair of links 11 to bar 6. The upturned extension 12 of said bar is pivotally connected to the upper end of shoe-carrying member 13. A clamping shoe 14 is threadedly secured in the lower end of member 13 for adjustment properly to engage the side 8 of rail head 4, a lock nut 15 being provided to secure such shoe in adjusted position. The end of curved lever 9 is pivotally connected to member 13 intermediate the ends of the latter. As best shown in Fig. 1, when handle 10 has been rocked downwardly to bring shoe 14 into rail clamping position, the pivotal connection of lever 9 with member 13 will be shifted upwardly slightly above the points of pivotal connection of links 11 thereby obtaining a toggle effect maintaining the apparatus firmly clamped on the rail head. A stop pin 16 on member 13 limits the maximum downward movement of such links 11.

Extensions 17 and 18 of arms 2 and 3 carry vertically disposed adjusting screws 19 and 20 adapted to rest on the rail head whereby the apparatus may be properly positioned vertically relative thereto.

A pair of identical mold blocks 21 and 22 are mounted side by side between arms 2 and 3 and the intervening clamping bar 6, being pivotally supported by a pin 23 passing therethrough parallel to rail head 4 whereby such mold blocks may be rocked to accommodate themselves to the side of such rail head. Shoes 24 and 25 are suspended from pivot pin 26 likewise passing through arms 2 and 3 and are caused to bear against the lower rear portions of the respective mold blocks by means of compression springs 27 and 28. The upper portions of the mold blocks are rocked in a counterclockwise direction about supporting pin 23 as viewed in Fig. 1 through the action of such springs and shoes, to the extent permitted by engagement of the upper rear portions of the blocks with the upper ends of such shoes carried by pin 26. Accordingly, as best shown in Fig. 4, when the face of the mold block 22 has been drawn firmly against the side of the rail head through action of the toggle clamp, such mold block may be rocked somewhat in a clockwise direction about its pivot 23 thereby further compressing spring 28. A wear plate 29 will desirably be affixed to the back of each mold block for engagement by the corresponding spring-backed shoe, both shoe and plate being cut away in a central portion (see Fig. 6) to avoid interference with a rail bond 30 which is to be assembled with the apparatus in a manner explained below. As best shown in Fig. 4, clamping bar 6 will preferably be joined to U-frame member 1 by means of a vertically extending plate or web portion 31 through which pivot pins 23 and 26 may pass to provide additional bearings therefor.

Each mold block assembly is provided with a pair of laterally spaced upwardly curved spring clip members 32 secured to the backs of the respective mold blocks beneath wear plates 29 and terminating in a recurved upwardly extending end portion 33 directly beneath such mold blocks to either side of the mold cavities 34 therein. The sleeved ends 35 of generally U-shaped rail bond 30 are adapted to be received in such mold cavities 34, such sleeved ends entering such cavities from the rear and below through grooves 36 in the bottom of the mold block. The general position of the bond is shown in dot-and-dash line in Fig. 3 and the manner in which the ends of the bond enter the mold cavities is best shown in Fig. 4. Such bond ends 35 are retained in position in the mold cavities by means of separate sheet metal mold bottom members 37 provided with two laterally spaced upstanding ears 38 and 39 adapted to be positioned against the side 7 of the rail head. Spring clips 32 engage the undersides of false bottom members 37 holding the same in place against the bottoms of the respective mold blocks and the undersides of the respective bond ends, thereby permitting the bonding apparatus, bond, and false bottom members to be assembled and handled as a unit prior to placement on the rail head. The sleeved bond ends 35 will preferably be of rectangular cross-section to facilitate thus tightly assembling the same in such apparatus without permitting interstices for escape of weld metal from the mold cavities. The beveled ends 40 of the bond are thus presented to the rail face where the latter is exposed as through a window between the upstanding ears 38 and 39 of false bottom member 37.

The upper portion of each mold block is hollowed out to form a crucible 41 having the general shape of an inverted truncated cone with a sprue opening 42 of reduced diameter in the bottom thereof. The sprue leading to mold cavity 34 has an inclined back 43 adapted to direct the falling molten weld metal discharged from crucible 41 at an angle generally continued by the beveled end 40 of bond 30. Consequently, such weld metal is directed immediately across the exposed ends of the conductor strands making up such bond and against the exposed face of the steel rail. It is thereby ensured that both parts to be joined are thoroughly heated and a sound bond terminal obtained, without danger of mere accumulation of "cold shot" metal in the cavity. Each mold block is provided with an upper cover 44 hinged to the rear upper edge of the respective block at 45 and hollowed out to open toward the rail, whereby when an exothermic reaction is produced in the crucible the flash therefrom will be permitted ot escape in a direction away from the operator. Such cover will ordinarily be of graphite similarly to the mold block.

As best shown in Figs. 1 and 4, the face of the mold block will desirably be provided with shallow grooves 46 leading to mold cavity 34 and disposed at a level just below the ends of upstanding ears or tabs 38 and 39. These grooves thus provide for the overflow of a small amount of the weld metal. This has the advantage that a portion of the molten weld metal first encountering the bond end and rail face, and somewhat chilled thereby, may be caused to flow into such overflow passages while the following highly heated weld metal remains in the mold cavity ensuring homogeneous fusion of the bond end into the cast terminal which is itself securely welded to the rail face.

In operation, the bond 30 will first be mounted in the apparatus by clamping the sleeved ends 35 of such bond in the mold cavity by means of the steel stamping sheet metal false bottom members 37, the latter being securely (although temporarily) held in place by means of spring clips 32. Such apparatus is then positioned on the rail head, clamping shoe 14 having been adjusted to ensure that the mold blocks are drawn strongly toward the face 7 of the rail head when toggle clamp handle 10 is pushed downwardly into clamping position. Adjusting screws 20 will likewise be positioned to ensure that the lower rail engaging edges of sheet metal false bottom members 37 are substantially even with the lower edge of the rail head. (Of course, if desired, the apparatus may be adjusted to attach the bond at a more elevated position on the side of the rail head.) It will be seen that the upstanding ears 38 and 39 seal off the mold cavities 34 laterally thereof while sheet metal bottom portion 37, together with the bond end itself, close off the bottom and lower back portion of the mold cavity.

When metal producing exothermic reaction material such as that disclosed in Cadwell Patent No. 2,229,045 is placed in crucibles 41 and the covers 44 lowered, such material may then be ignited by means of a spark gun directing sparks through the opening in such cover disposed in the direction of the rail, the sprue opening 42 having first been closed by means of a thin metal disc. When the exothermic reaction material has thus been ignited, the molten weld metal produced melts through such closure discs and descends into the respective mold cavities, being directed by the inclined backs 43 of the sprue to flow across the ends of the conductor strands where exposed at the beveled ends 40 of the bond. Such sloping sprue 43 likewise directs the highly heated molten weld metal against the exposed face 7 of the rail head between upstanding ears 38 and 39 of the metal stamping ensuring that both the ends of the bond and the exposed portions of the rail face are thoroughly heated so that the following molten metal flowing into the mold cavity is effective to produce a thoroughly homogeneous weld. As shown in Fig. 4, the side of the sprue opposed to the rail head is cut away and opened toward the latter to facilitate the removal of slag therefrom.

Toggle clamp handle 10 will now be raised to unclamp the apparatus from the rail head and rocked sufficiently to permit shoe 14 to clear the top of the rail head as the apparatus is withdrawn generally laterally therefrom, disengaging spring clips 32 and leaving the bond 30 attached to the rail head as are also the sheet metal stampings 37. While such stampings may, if desired, be cut or broken away from the weld terminal, it is preferred to leave the same in situ since their removal is not necessary and they serve somewhat to strengthen and reinforce the terminals. In particular, they assist in supporting the undersides of the sleeved ends 35 of the bond.

The covers 44 may now be swung back and the crucibles 41 cleaned of slag and other residue before mounting another bond and pair of stampings 37 in the apparatus for attachment to the rail.

Reference may now be had to Figs. 8 to 14 inclusive of the drawing illustrating another embodiment of my invention having certain basic similarities to that described and explained above but differing therefrom principally in that a novel form of receptacle or shield may preliminarily be affixed to the respective ends of the bond for juxtaposition to the side of the rail head and serving with the latter to define the mold cavity into which the molten weld metal is to be discharged. In such figures, like numerals are employed to designate those parts identical or substantially identical with corresponding parts illustrated in Figs. 1–7 inclusive.

Figure 8:
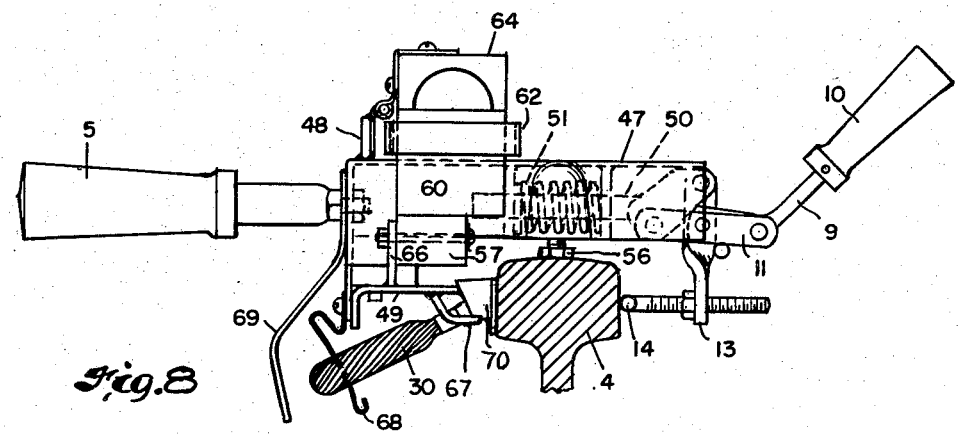
Fig. 8 is a side elevational view similar to Fig. 1 but illustrating another embodiment of my invention.
Figure 9:
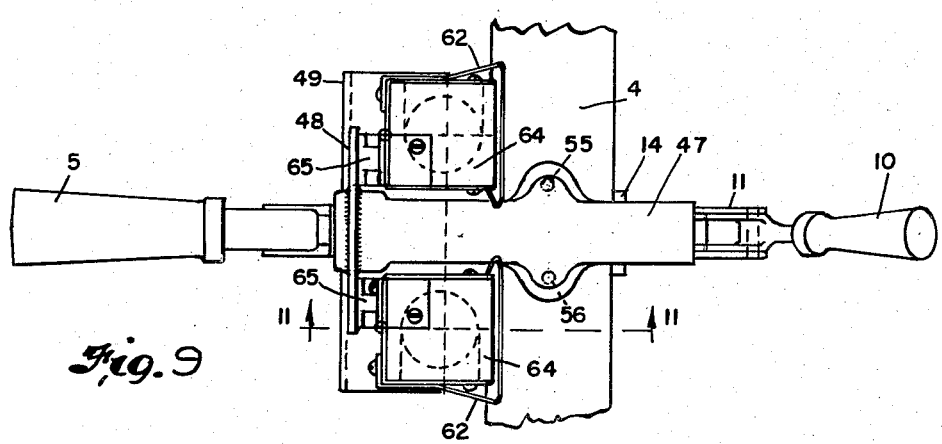
Fig. 9 is a top plan view of the apparatus of Fig. 8.
Figure 10:
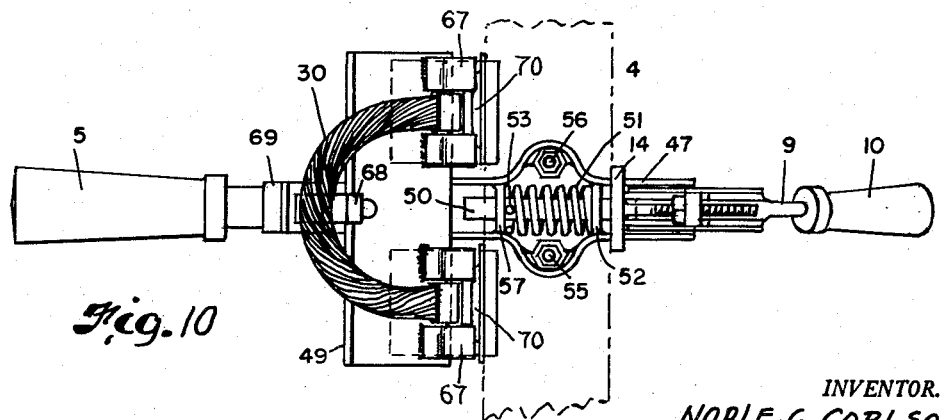
Fig. 10 is a bottom plan view of the apparatus of Fig. 8.

The mold supporting frame comprises an inverted channelform member 47 to an end of which handle 5 is attached. A small upper crossbar 48 is welded to the upper side of such channel adjacent the handle end thereof and a larger crossbar 49 is secured to the underside of such channel, the pair of crucibles being supported by such two cross-members to either side of channel 47 in a manner described more in detail below. A toggle clamp is carried by the other end of channel 47 including a handle 10 and otherwise identical with that of the Fig. 1 embodiment except that the rod 50 corresponding to rod 6 of Fig. 1 extends only about ⅔ the length of channel 47 and is adapted to be reciprocated therewithin when handle 10 is rocked downwardly with shoe 14 in engagement with the rail head (Fig. 8). A compression spring 51 encircles such rod bearing at one end against stop 52 welded within channel 47 and at its other end against a pin 53 in rod 50. A stop member 57 within channel 47 is adapted to be engaged by pin 53 limiting movement of rod 50 in the direction of handle 5. Insofar as the toggle clamping action of shoe 14 is concerned, it will be seen that such spring 51 takes the place of springs 27 and 28 of the Fig. 1 embodiment. Thus, when handle 10 is rocked in a downward direction as shown in Figs. 8 to 10 inclusive, a longitudinal pull is exerted on rod 50 tending to compress spring 51 to hold the apparatus firmly clamped on the rail head.

Figure 11:
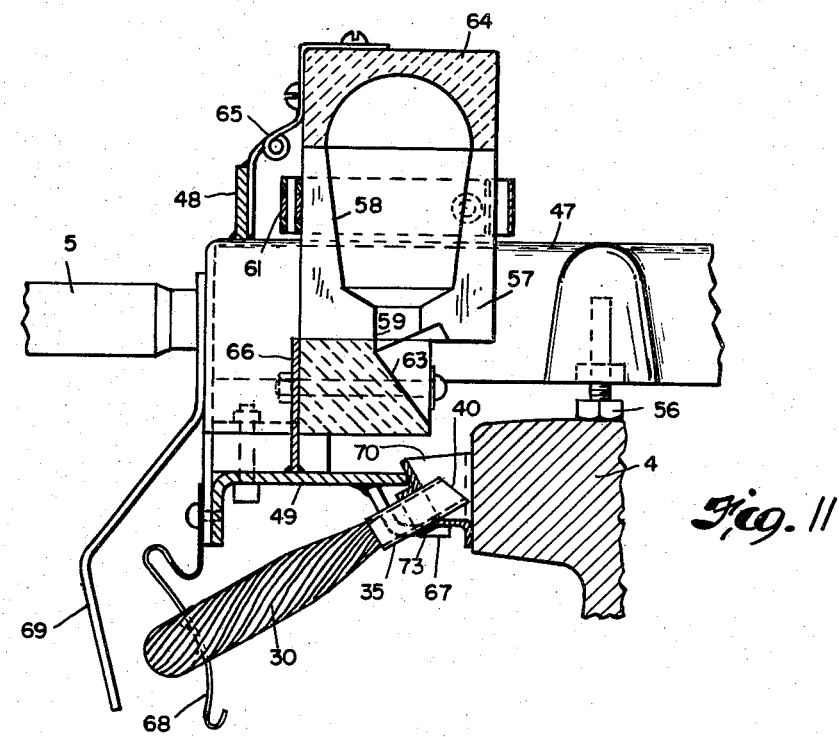
Fig. 11 is a vertical sectional view taken on the line 11—11 on Fig. 9.

The vertical positioning of the apparatus relative to the rail head is determined by a pair of adjustable screws 55 and 56 threadedly mounted in an expanded portion of channel member 47. As best shown in Fig. 11, such screws may be turned to adjust the vertical position of the apparatus on the rail head.

The two crucible assemblies are substantially identical being mirror images of one another, each comprising a graphite block 57 including one-half of the crucible 58 and sprue opening 59, the other half of such latter elements being included in portion 60 hingedly secured thereto at 61, so that it will be seen that the crucible is thus split or divided along a vertical median line. A spring catch 62 is provided to lock the two sections of the crucible together. The lower portion of block 57 is scooped out to provide an inclined sprue 63 to receive molten metal discharged from such crucible through sprue opening 59. A graphite cover 64 is provided for each crucible hingedly attached at 65 to the corresponding end of crossbar 48, such cover being hollowed out to provide for the escape of heated gases, etc., resulting from the exothermic reaction within the crucible laterally of the apparatus. Such crucible blocks 57 and their complementary crucible portions 60 hingedly attached thereto are carried by upstanding flanges 66 welded to lower crossbar 49 to either side of channel frame member 47.

Two pair of laterally spaced prongs 67 are welded to the underside of lower crossbar 49 in position to project toward the rail head when the apparatus is mounted thereon, the prongs of each pair being positioned below a respective crucible block 57 and spaced laterally of the corresponding sprue 63. A downwardly extending spring clip 68 is attached to the handle end of channelform frame member 47, protected by a rigid downwardly extending guard 69.

Figure 14:
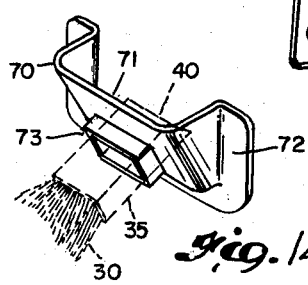
Fig. 14 is a detail perspective view of a metal element adapted to provide the mold cavity proper.
Figure 13:
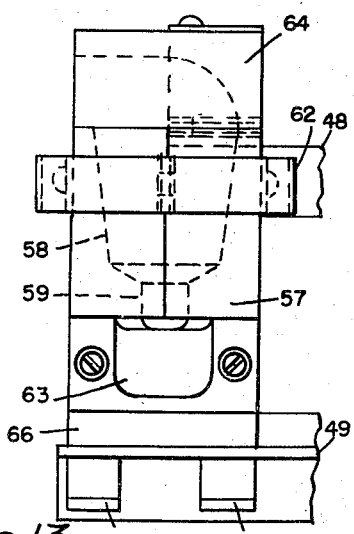
Fig. 13 is an elevational view of the side of such mold assembly adapted to be presented to the rail head.

Referring now more particularly to Fig. 14 of the drawing, the bond 30 may be of the same general type illustrated in conjunction with Figs. 1–7 inclusive, the sleeved ends 35 being beveled at their extremities 40 as before. Such sleeved ends, preferably of rectangular cross-section, will, however, be preliminarily assembled with steel stampings 70 having a dished rearwardly inclined portion 71 adapted to provide a receptacle for the molten weld metal and a flat outwardly extending flange 72 adapted to abut the face of the rail head. Such dished portion is apertured to receive the sleeved end portion 35 of bond 30, making a tight fit with the latter, preferably with an outwardly extending collar 73 about such aperture embracing such bond end (see Figs. 11 and 14). The downwardly extending portion of flange 72 may be much reduced and in fact such flange may be entirely dispensed with if necessary. It, however, facilitates placement of the stamping against the side of the rail head. The beveled extremity 40 of the bond protrudes through the aperture in such stamping so that the end of the bond is generally centrally positioned within the mold cavity formed by such stamping when the latter is juxtaposed to the face of the rail head, with the lower edge of such extremity close to the side of the rail head.

Figure 12:
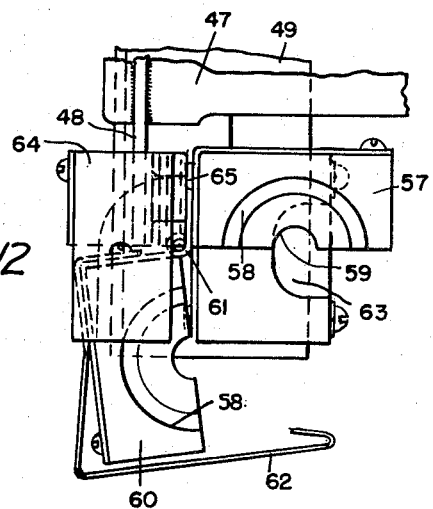
Fig. 12 is a fragmentary top plan view of one mold assembly of the embodiment illustrated in such Figs. 8–11 inclusive showing the manner in which the split crucible portion of such assembly may be opened.

Before mounting the apparatus upon the rail head, the bond will first be assembled thereto, the central portion of the bond being hooked over the spring clip member 68 and the sheet metal stampings 70, already press fitted on the respective end portions of such bond, hooked into prongs 67 whereby such apparatus and bond assembled therewith may be handled as a unit. It will be noted, as best illustrated in Fig. 11, that the inclined back of the sprue in mold block 57 will be positioned to direct a stream of molten weld metal discharged from crucible 58 across the exposed ends of the conductor strands composing bond 30 and against the face of the rail head. When the apparatus has been firmly clamped on the rail head in properly adjusted position by means of the toggle clamp, the respective dished stampings 71 will be held against the side of the rail head by all the force of such toggle clamping means. Upon igniting the exothermic reaction mixture in crucible 58 (as described above), the molten weld metal will be discharged into the receptacle formed by stamping 70 and containing the exposed beveled end of such bond, thereby producing a homogeneous welded terminal. The gaseous products of the reaction and flash from the crucible will escape laterally from the hollowed out covers 64 of the crucible. Cleaning of the crucible is facilitated by the fact that sprue 63 is exposed and readily accessible, and crucible portion 60 may be unlatched and swung to open position as shown in Fig. 12.

After forming the cast welded terminals, the apparatus may be very promptly withdrawn from the rail head by rocking toggle clamp handle 10 in an upward direction and pushing spring clip 68 upwardly out of engagement with bond 30. The apparatus may then be withdrawn laterally of the rail a short distance sufficient to disengage prongs 67 from the stampings 70 whereupon the entire apparatus may be lifted directly upwards.

The separable sheet metal bottom members 37 and receptacles 70, while ordinarily preferably of steel, may be of other metals such as copper of proper gauge to ensure that the molten weld metal will not melt through the same. The inclined sprues, of course, serve to direct the falling stream of highly heated weld metal toward the side of the rail head so that there is little tendency for such stream to bore through the sheet metal members. Upstanding tabs or ears 38 and 39 on sheet metal member 37 are not absolutely essential but are of assistance in properly positioning such member in the assembly. They also become bonded to the rail and terminal, having a reinforcing effect in incorporating the sheet metal member as an integral part of the finished cast welded terminal. While such member may be designed to facilitate breaking the same away from the finished terminal, this is ordinarily neither necessary nor desirable.

While particularly adapted to the attachment of copper rail bonds to steel rails it will be readily apparent that my new apparatus is suitable for the attachment of various types of conductors to many different objects, including pipe-lines, parts of machines, and the like.

Other modes of applying the principle of the invention may be employed, change being made as regards the details described, provided the features stated in any of the following claims or the equivalent of such be employed.

I therefore particularly point out and distinctly claim as my invention:

1. The method of attaching a copper rail bond to the side of a steel rail head adjacent the lower edge of the latter which comprises positioning an end of such bond in a mold cavity in part defined by the side of such rail head, in part by a mold member, and in part by a separable sheet steel bottom member closely adjacent such lower edge, with such bond end protruding over such sheet steel bottom member, producing a charge of highly heated molten copper by an exothermic reaction, and immediately delivering such charge into such mold cavity to form a cast welded terminal connecting such bond to such rail head, with such sheet steel mold bottom member joined to and comprising an integral part of such terminal.

2. The method of attaching a copper rail bond to the side of a metal rail head adjacent the lower edge of the latter which comprises positioning an end of such bond in a mold cavity in part defined by the side of such rail head, in part by a mold member, and in part by a separable sheet metal bottom member closely adjacent such lower edge, with such bond end protruding over such sheet metal bottom member, producing a charge of highly heated molten copper by an exothermic reaction, and immediately delivering such charge into such mold cavity to form a cast welded terminal connecting such bond to such rail head, with such sheet metal mold bottom member joined to and comprising an integral part of such terminal.

3. In rail bonding apparatus of the character described, a frame, a pair of laterally spaced graphite blocks carried by said frame for engagement with the side of a rail head, pivot means mounting said blocks for rocking movement about an axis parallel to the rail engaging faces of the same, resilient means tending to rock the lower portions of said blocks toward such rail, stop means limiting such rocking movement, crucibles hollowed in the upper portions of said blocks and mold cavities hollowed in the lower portions thereof, said mold cavities being open toward the side of such rail head and in a downward direction, said blocks also being grooved in their undersides to provide grooves extending from rear to front in a slightly upward direction into such mold cavities to accommodate and closely fit the respective end portions of a generally U-shaped rail bond, with the ends of such bond extending into said respective mold cavities and juxtaposed to the side of such rail head, spring clip means disposed to each side of each said groove and extending toward such rail head in position to clamp and retain separable sheet metal bottom members for said cavities, generally flat sheet metal bottom members for said cavities each having a pair of upturned tabs adapted to lie against such rail head to either side of said respective cavities, overflow vents for said cavities comprising small laterally extending grooves in the faces of said blocks to each side of said cavities and opposed to said tabs, sprues having downwardly outwardly inclined backs leading from said crucibles to said respective mold cavities for discharge of molten metal produced by an exothermic reaction thereinto, and clamping means on said frame adapted to engage the opposite side of such rail head to secure said blocks in firm engagement thereagainst, said clamping means, when released, being adapted to clear the top of the rail whereby the apparatus may be withdrawn laterally from the rail to disengage said spring clip means from said sheet metal bottom members, which will remain attached to the cast welded terminals.

4. In rail bonding apparatus of the character described, the combination of a supporting frame adapted to rest upon a rail head, a pair of laterally spaced mold and crucible blocks carried by said frame for engagement with a side of such rail head, pivot means through the lower portions of said blocks mounting the same for rocking movement about an axis parallel to the rail engaging faces of the blocks, compression springs interposed between said frame and the lower portions of said blocks tending to rock such lower portions toward such rail head, stop means limiting such rocking movement, crucibles hollowed in the upper portions of said blocks and mold cavities hollowed in the lower portions thereof, said mold cavities being open toward the side of such rail head and also open in a downward direction, said blocks also being grooved in their undersides to provide grooves extending from front to rear into such mold cavities to accommodate and closely fit the respective end portions of a generally U-shaped rail bond, with the ends of such bond extending into said respective mold cavities and adapted to be juxtaposed to the side of such rail head, spring clip means disposed to each side of each said groove and extending toward such rail head in position to clamp and retain separable sheet metal bottom members for said cavities, generally flat sheet metal bottom members for said cavities each having a pair of upturned tabs adapted to lie against such rail head between the same and said blocks to either side of said respective cavities, overflow vents for said cavities comprising small laterally extending grooves in the faces of said blocks to each side of said cavities and opposed to said tabs, said overflow vents being spaced upwardly from the bottoms of said cavities defined by said separable sheet metal bottom members, sprues having downwardly outwardly inclined backs leading from said crucibles to said respective mold cavities for discharge of molten metal produced by an exothermic reaction into said cavities at an angle toward such rail head, and toggle clamping means on said frame adapted to engage the opposite side of such rail head from said blocks to secure said blocks in firm engagement with such rail head by partial compression of said springs, said clamping means, when released, being adapted to clear the top of the rail head whereby the apparatus may be withdrawn laterally from the rail to disengage said spring clip means from said sheet metal bottom members, which will remain attached to the cast welded terminals.

5. In rail bonding apparatus, a mold supporting frame, a mold supported thereby for engagement with the side of a rail head, said mold having a mold cavity in its rail contacting face and open in a downward direction, a groove in the underside of said mold extending from front to rear into such mold cavity and adapted to accommodate and closely fit the end portion of a rail bond, with the end of such bond extending into such mold cavity and adapted to be juxtaposed to the side of such rail head, spring clip means disposed to each side of said groove and extending toward such rail head in position to clamp and retain a separable sheet metal bottom member for said cavity, a generally flat sheet metal bottom member for said cavity having a pair of upturned tabs adapted to lie flat against the face of said mold opposed to the side of such rail head to either side of such cavity, and clamping means on said frame adapted to engage the opposite side of such rail head from said mold to secure said mold in firm engagement with such rail head, said clamping means, when released, being adapted to clear the top of the rail head whereby the apparatus may be withdrawn laterally from the rail to disengage said spring clip means from said sheet metal bottom member, which may remain attached to a cast welded terminal produced by charging molten weld metal into such cavity.

6. In rail bonding apparatus, a mold supporting frame, a mold supported thereby for engagement with the side of a rail head, said mold having a mold cavity in its rail contacting face and open in a downward direction, a groove in the underside of said mold extending from front to rear into such mold cavity and adapted to accommodate and closely fit the end portion of a rail bond, with the end of such bond extending into such mold cavity and adapted to be juxtaposed to the side of such rail head, spring clip means adapted to engage the underside of a separable sheet metal bottom member for such cavity and hold the same in tight engagement with the underside of such bond and said mold, a sheet metal bottom member for such cavity adapted to be thus assembled and retained with said mold and such bond, and clamping means on said frame adapted to engage the opposite side of such rail head from said mold to secure said mold in firm engagement with such rail head, said clamping means, when released, being adapted to clear the top of the rail head whereby the apparatus may be withdrawn laterally from the rail to disengage said spring clip means from said sheet metal bottom member, which may remain attached to a cast welded terminal produced by charging molten weld metal into such cavity.

7. In rail bonding apparatus, the combination of a supporting frame, a mold block supported thereby and having a mold cavity in a rail-engaging face, such cavity also opening in a downward direction, a separable sheet metal false bottom member adapted to be temporarily secured to the underside of said block to close the bottom of such cavity, means carried by said frame adapted thus releasably to secure said false bottom member to the underside of said block, a groove in the underside of said block extending in a rearwardly direction from such cavity and adapted to receive and closely fit the end portion of a rail bond, with the end of such bond extending into such cavity, and clamping means adapted to engage the other side of such rail head from said block to hold the latter in firm engagement with such rail head, said clamping means, when released, being movable into non-interfering position relative to such rail head whereby said block may be withdrawn laterally from such rail sufficient to disengage from a cast terminal in such cavity and from said false bottom member joined to such terminal.

8. In rail bonding apparatus, a mold block adapted to be closely opposed to the side of a rail head and having a mold cavity in the side thus opposed to such rail, such cavity also opening in a downward direction, a separable sheet metal bottom member adapted temporarily to close the bottom of such cavity, means on said apparatus releasably securing said bottom member in cavity closing position, a groove in the underside of said block leading to such cavity and with said bottom member defining a passage adapted closely to fit the end portion of a rail bond with the end of such bond extending into such cavity, and a sprue leading to such cavity from above.

9. In a rail bonding apparatus, a mold block adapted to be closely opposed to the side of a rail head and having a mold cavity in the side thus opposed to such rail, such cavity also opening in a downward direction, a separable sheet metal bottom member adapted temporarily to close the bottom of such cavity, means on said apparatus releasably securing said bottom member in cavity closing position, and a passage leading into such cavity adjacent said separable bottom member adapted closely to fit the end portion of a rail bond with the end of such bond extending into such cavity, such cavity also opening upwardly to receive a charge of molten weld metal from above.

10. In rail bonding apparatus, a mold adapted to be closely opposed to the side of a rail head and having a mold cavity in the face thus opposed to such rail, such cavity opening in a downward direction, a separable bottom member for said mold adapted temporarily to close the bottom of such cavity, means on said apparatus adapted releasably to secure said bottom member against said mold in cavity closing position, and a passage leading into such cavity adjacent said separable bottom member adapted closely to fit the end portion of a rail bond with the end of such bond extending into such cavity, such cavity also opening upwardly to receive a charge of molten weld metal from above.

11. A mold for use in attaching a small metal article to the surface of a larger metal article by cast welding having a mold cavity adapted to be opposed to such surface with a portion of such smaller article extending therein, such cavity opening downwardly, a separable bottom member for said mold adapted to close the bottom of such cavity, and means releasably securing said bottom member against said mold in cavity closing position, such cavity also opening upwardly to receive a charge of molten weld metal from above.

12. In combination, a mold block adapted to be closely opposed to the side of a rail head and having a mold cavity in the face thereof thus opposed to such rail, such cavity also opening in a downward direction, a separable sheet metal bottom member for said mold adapted temporarily to close the bottom of such cavity, said bottom member having upwardly extending portions adapted to engage such face of said block to either side of such cavity to position said bottom member properly with regard thereto, means releasably securing said bottom member against said mold block in cavity closing position, and a passage leading into such cavity adjacent said separable bottom member adapted closely to fit the end portion of a rail bond with the end of such bond extending into such cavity, such cavity also opening upwardly to receive a charge of molten weld metal from above.

13. In rail bonding apparatus of the character described, a frame, a pair of laterally spaced graphite blocks carried by said frame for positioning adjacent the side of a rail head, crucibles hollowed in said blocks having sprue openings in the bottoms thereof, sprue passages leading therefrom open on the side toward such rail and having back portions downwardly inclined toward such side of such rail head, pairs of laterally spaced prongs respectively carried by said frame below and to either side of said sprue passages, said prongs projecting toward such rail and adapted to engage dished sheet metal stampings mounted on the respective ends of a U-shaped rail bond, and clamping means on said frame adapted to engage the opposite side of such rail head to force such stampings against such rail head to define with the latter receptacles for weld metal from said crucibles.

14. In rail bonding apparatus of the character described, a frame, a pair of laterally spaced graphite blocks carried by said frame for positioning adjacent the side of a rail head, crucibles hollowed in said blocks having sprue openings in the bottoms thereof, pairs of laterally spaced prongs respectively carried by said frame below and to either side of said sprue openings, said prongs projecting toward such rail and adapted to engage dished sheet metal stampings mounted on the respective ends of a U-shaped rail bond, and clamping means on said frame adapted to engage the opposite side of such rail head to force such stampings against such rail head to define with the latter receptacles for weld metal from said crucibles.

15. In rail bonding apparatus of the character described, a frame, a pair of laterally spaced graphite blocks carried by said frame for positioning adjacent the side of a rail head, crucibles hollowed in said blocks having sprue openings in the bottoms thereof, pairs of laterally spaced prongs respectively carried by said frame below and to either side of said sprue openings, said prongs projecting toward such rail and adapted to engage dished sheet metal stampings mounted on the respective ends of a U-shaped rail bond, a spring clip mounted on said frame and adapted resiliently to engage such bond generally centrally thereof to hold such stampings in engagement with said prongs, and clamping means on said frame adapted to engage the opposite side of such rail head to force such stampings against such rail head to define with the latter receptacles for weld metal from said crucibles.

16. In rail bonding apparatus of the character described, a frame, a pair of crucibles carried by said frame for positioning adjacent the side of a rail head, said crucibles having sprue openings in the bottoms thereof, pairs of laterally spaced prongs respectively carried by said frame below and to either side of said sprue openings, said prongs projecting toward such rail and adapted to engage dished sheet metal stampings mounted on the respective ends of a U-shaped rail bond, a spring clip mounted on said frame and adapted resiliently to engage such bond generally centrally thereof to hold such stampings in engagement with said prongs, and clamping means on said frame adapted to engage the opposite side of such rail head to force such stampings against such rail head to define with the latter receptacles for weld metal from said crucibles.

17. In rail bonding apparatus of the character described, a frame, a pair of crucibles carried by said frame for positioning adjacent the side of a rail head, said crucibles having sprue openings in the bottoms thereof, presser members carried by said frame below said crucibles and adapted to engage dished metal stampings on the respective ends of a U-shaped rail bond to urge such stampings against such side of the rail head, means on said frame adapted releasably to engage such bond generally centrally thereof to hold such stampings in engagement with said presser members, and mounting means for said frame adapted to mount the same on a rail head with such stampings held against the side of such rail head to define with the latter receptacles for weld metal from said crucibles.

18. In rail bonding apparatus of the character described, an assembly comprising a crucible having a sprue opening in the bottom thereof, a sheet metal stamping adapted to receive the end portion of a rail bond and, when juxtaposed to the side of a rail head, to define with the latter a receptacle for weld metal from said crucible, and supporting means arranged and adapted to hold said stamping against such rail and to support said crucible thereover in position to discharge weld metal into the receptacle thus defined by said stamping and rail head.

19. In rail bonding apparatus of the character described including mold cavity defining means, an assembly comprising a sheet metal member adapted to define the bottom of such mold cavity when juxtaposed to the side of a rail head itself defining a side of such cavity, clamping means arranged to clamp said member in such position against such rail head, and a rail bond supported by said apparatus with an end extending into such cavity laterally above said bottom member.

References Cited in the file of this patent

UNITED STATES PATENTS

| | | |
|---|---|---|
| 1,215,933 | Hartman | Feb. 13, 1917 |
| 1,297,383 | Mead | Mar. 18, 1919 |
| 1,511,189 | Burgett | Oct. 7, 1924 |
| 1,576,230 | Shuler | Mar. 9, 1926 |
| 1,581,455 | Lincoln | Apr. 20, 1926 |
| 1,617,836 | Daugherty | Feb. 15, 1927 |
| 1,675,750 | Dahlstrom | July 3, 1928 |
| 1,712,426 | Febrey | May 7, 1929 |
| 1,756,054 | Crum | Apr. 29, 1936 |
| 2,108,996 | Sansome | Feb. 22, 1938 |
| 2,150,045 | Ahlert | Mar. 7, 1939 |
| 2,238,926 | Cadwell | Apr. 22, 1941 |
| 2,276,823 | Cadwell | Mar. 17, 1942 |
| 2,277,014 | Carlson | Mar. 17, 1942 |
| 2,318,604 | Febrey | May 11, 1943 |
| 2,360,758 | Cadwell | Oct. 17, 1944 |

FOREIGN PATENTS

| | | |
|---|---|---|
| 15,278 | Great Britain | July 8, 1904 |